(12) United States Patent
Asturias et al.

(10) Patent No.: US 11,288,448 B2
(45) Date of Patent: Mar. 29, 2022

(54) TECHNIQUES FOR IMPLEMENTING A COMMAND LINE INTERFACE

(71) Applicant: Arista Networks, Inc., Santa Clara, CA (US)

(72) Inventors: Diego Asturias, Mountain View, CA (US); Peter Rufer, Palo Alto, CA (US); Hua Zhong, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 289 days.

(21) Appl. No.: 16/523,784

(22) Filed: Jul. 26, 2019

(65) Prior Publication Data

US 2021/0026917 A1  Jan. 28, 2021

(51) Int. Cl.
*G06F 40/211* (2020.01)
*H04L 12/24* (2006.01)
*G06F 40/253* (2020.01)
*G06F 40/284* (2020.01)
*G06F 8/41* (2018.01)
*H04L 41/22* (2022.01)

(52) U.S. Cl.
CPC .............. *G06F 40/211* (2020.01); *G06F 8/42* (2013.01); *G06F 8/427* (2013.01); *G06F 40/253* (2020.01); *G06F 40/284* (2020.01); *H04L 41/22* (2013.01)

(58) Field of Classification Search
None
See application file for complete search history.

(56) References Cited

U.S. PATENT DOCUMENTS

| | | | | |
|---|---|---|---|---|
| 6,848,078 | B1* | 1/2005 | Birsan | G06F 16/904 715/206 |
| 7,949,734 | B1* | 5/2011 | Fong | H04L 41/0843 709/221 |
| 2003/0048287 | A1* | 3/2003 | Little | G06F 9/45512 715/705 |
| 2003/0105847 | A1* | 6/2003 | Jennery | H04L 29/06 709/223 |
| 2004/0040016 | A1* | 2/2004 | Pearce | G06F 9/45512 717/141 |
| 2005/0060693 | A1* | 3/2005 | Robison | G06F 9/45512 717/143 |
| 2006/0242403 | A1* | 10/2006 | Joshi | G06F 8/427 713/150 |
| 2006/0282453 | A1* | 12/2006 | Tjong | G06F 8/42 |
| 2007/0006179 | A1* | 1/2007 | Tjong | G06F 8/51 717/136 |
| 2007/0006196 | A1* | 1/2007 | Tjong | G06F 8/51 717/151 |
| 2007/0011348 | A1* | 1/2007 | Bansal | H04L 45/60 709/238 |

(Continued)

*Primary Examiner* — Qing Chen
(74) *Attorney, Agent, or Firm* — Fountainhead Law Group P.C.

(57) ABSTRACT

Techniques for implementing an improved command line interface (CLI) are provided. In certain embodiments, this improved CLI can provide a CLI command definition language that enables developers, users, and/or other entities to define CLI commands in a straightforward and flexible manner, create optimized parse graphs based on the CLI command definitions, and employ an efficient algorithm for traversing a parse graph at, e.g., CLI runtime in order to parse an input text string and match that string to a valid CLI command.

17 Claims, 8 Drawing Sheets

(56) References Cited

U.S. PATENT DOCUMENTS

| | | | |
|---|---|---|---|
| 2007/0169008 A1* | 7/2007 | Varanasi | H04L 41/08 |
| | | | 717/136 |
| 2012/0246621 A1* | 9/2012 | Mukkavilli | G06F 11/3684 |
| | | | 717/126 |
| 2014/0122511 A1* | 5/2014 | Waye | G06F 16/21 |
| | | | 707/756 |
| 2015/0019199 A1* | 1/2015 | Andrews | G06F 9/45508 |
| | | | 703/26 |

* cited by examiner

TECHNIQUES FOR IMPLEMENTING A COMMAND LINE INTERFACE

BACKGROUND

Many network devices provide a command line interface (CLI) that allows users to configure, manage, and monitor the network device via text commands. In a typical CLI user workflow, a user initiates a CLI session and is presented with a command prompt such as "switch>." The user enters text at the command prompt that corresponds to a CLI command the user wishes to execute. The CLI then parses the entered text and determines whether it matches a valid command understood by the CLI. If so, the CLI executes the matched command and presents an execution result, if appropriate, to the user.

The manner in which a given CLI implementation enables CLI command definition, represents CLI commands internally, and parses an input text string in view of the internal command representations can have a significant impact on its usability and performance. For example, a complicated and inflexible command definition language can make it cumbersome for developers to create and test new CLI commands and can limit the expressiveness of those commands. Further, an inefficient internal command representation or parsing algorithm can adversely affect the CLI's parsing speed and thus reduce its responsiveness for users.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

Embodiments of the present disclosure are directed to an improved CLI for a computing system or device such as a network device. Generally speaking, this improved CLI can, among other things, (1) provide a CLI command definition language that enables developers, users, and/or other entities to define CLI commands in a straightforward and flexible manner, (2) create optimized parse graphs based on the CLI command definitions, and (3) employ an efficient algorithm for traversing a parse graph at, e.g., CLI runtime in order to parse an input text string and match that string to a valid CLI command.

1. CLI Architecture

Figure 1:
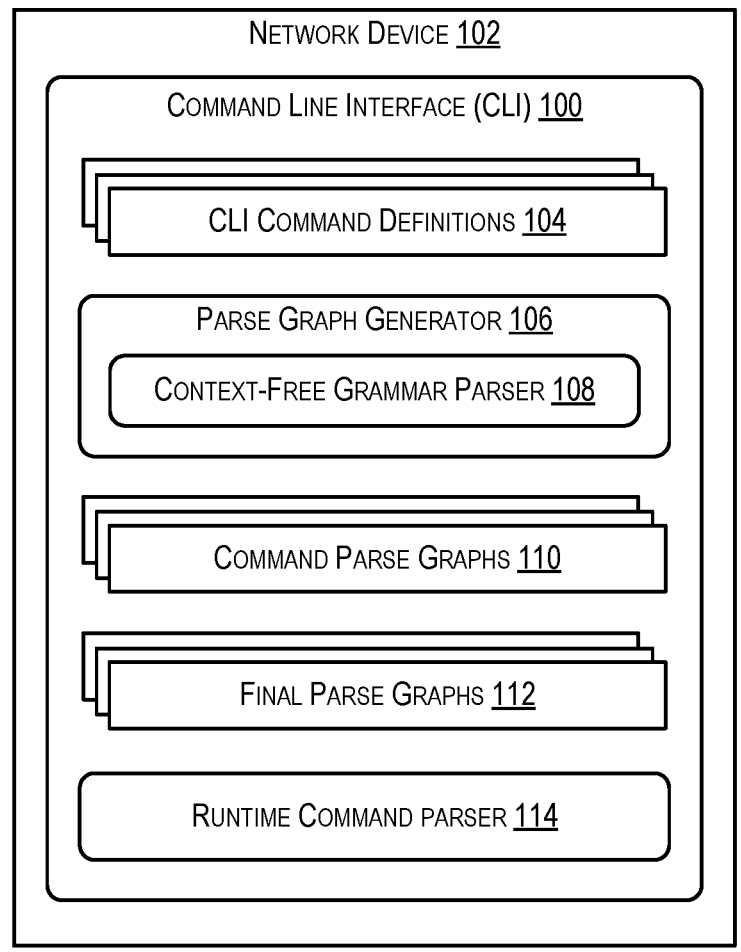
FIG. 1 depicts a CLI architecture according to certain embodiments.

FIG. 1 is a block diagram illustrating the high-level architecture of a CLI 100 according to certain embodiments. In these and other embodiments described herein, it is assumed that CLI 100 runs on a network device 102 such as a network switch or network router. However, CLI 100 may also be implemented on any other type of computing system or device in which CLI functionality is useful or desired.

As shown in FIG. 1, CLI 100 includes a set of CLI command definitions 104, a parse graph generator 106 comprising a context-free grammar parser 108, a set of command parse graphs 110, one or more final parse graphs 112, and a runtime command parser 114.

CLI command definitions 104 can be created by developers, users, and/or other entities (e.g., automated agents) and can define the structures and properties of the CLI commands understood and executable by CLI 100. In one set of embodiments, each CLI command definition 104 can include, inter alia, (1) a syntax string comprising one or more syntax elements (e.g., command keywords, input parameters, etc.) where the syntax string expresses a context-free grammar for producing valid instances of the CLI command (in other words, valid combinations/sequences of the syntax elements), and (2) a data structure comprising, for each syntax element, semantic information indicating how that syntax element may be matched to token(s) in an input text string. Further, in certain embodiments the per-element semantic information can include functions, rules, and/or parameters that are capable of modifying, restricting, or overriding the production rules of the context-free grammar based on, e.g., contextual cues determined at CLI runtime (e.g., the input text string's content, CLI/device state at the time the input text string is received, etc.). With this command definition language, entities that are tasked with creating new CLI commands for CLI 100 can define the syntax of their commands in a relatively simple way via the context-free grammar-based syntax string, and at the same time have the flexibility to adjust how that context-free grammar is applied at CLI runtime in a dynamic (e.g., context sensitive) fashion via the per-element semantic information.

Parse graph generator 106 can, in conjunction with context-free grammar parser 108, translate each CLI command definition 104 into a command parse graph 110 that encodes the CLI command's syntax string/context-free grammar and the semantic information for each syntax element. Parse graph generator 106 can then aggregate command parse graphs 110 into one or more final parse graphs 112, where each final parse graph 112 can be associated with a category or class of CLI commands and can incorporate the command parse graphs of CLI commands that are determined to be within that command category/class. For example, in one set of embodiments each final parse graph 112 can be associated with a CLI command mode supported by CLI 100 and can incorporate the command parse graphs for CLI commands that are registered to that mode.

Significantly, as part of building each final parse graph 112, parse graph generator 106 can merge together graph nodes from different command parse graphs that are deemed to be the same (or in other words, represent identical or substantially similar command syntax elements) and that satisfy certain other criteria. This merging process can reduce the total number of nodes in each final parse graph 112, which in turn can reduce the memory footprint of the graph and increase the speed at which the graph can be traversed.

Once parse graph generator 106 has generated final parse graph(s) 112 from CLI command definitions 104, runtime command parser 114 can receive an input text string from a user or some other source (e.g., a script, database table, local or remote application, etc.) during the runtime of CLI 100 and can execute an algorithm to parse the input text string by traversing an appropriate final parse graph 112 (e.g., a final parse graph corresponding to the currently-running command mode of CLI 100). If the execution of this algorithm results in a match between the input text string and a particular CLI command, runtime command parser 114 can invoke a command handler function associated with the matched CLI command, thereby executing the command. In certain embodiments, this algorithm can enable runtime command parser 114 to traverse the final parse graph in a breadth-first manner and efficiently take into account the per-element semantic information encoded into the graph.

The following sections provide further details regarding the implementation/format of CLI command definitions 104, parse graph generator 106, parse graphs 110/112, and runtime command parser 114 according to various embodiments. It should be appreciated that the CLI architecture depicted in FIG. 1 is illustrative and not intended to limit embodiments of the present disclosure. For instance, although FIG. 1 depicts a particular arrangement for components 104-114, other arrangements are possible (e.g., the functionality attributed to a particular component may be split into multiple components, components may be combined, etc.). Further, CLI 100 may include other components/sub-components and/or implement other functions that are not specifically described. One of ordinary skill in the art will recognize other variations, modifications, and alternatives.

2. CLI Command Definitions

As indicated above, CLI command definitions 104 define the structures and properties of the CLI commands understood and executable by CLI 100. These CLI command definitions may be expressed in a number of different ways, such as via source code written in a programming language (e.g., Python, Java, etc.), via structured data written in a data markup language (e.g., eXtensible Markup Language (XML), etc.), or via a combination of the two. Further, CLI command definitions 104 may be embodied and stored on network device 102 in a number of different formats, such as in the form of one or more files, one or more database records, and/or other data objects or containers.

In terms of content, in certain embodiments each CLI command definition 104 can include (1) a syntax string, (2) a data dictionary, (3) a command handler (or a binding to a command handler), and (4) one or more mode associations. Each of these command definition components are discussed in turn below.

2.1 Syntax String

The syntax string of a CLI command definition defines the syntactic structure of the CLI command—in other words, how the command's syntax elements (e.g., command keywords, input parameters, etc.) may be combined and sequenced in order to produce valid instances of the command that are understood by CLI 100.

In one set of embodiments, the syntax string can express the acceptable combinations/sequences of these syntax elements as a context-free grammar. As used herein, a context-free grammar is a set of one or more production rules that map a non-terminal symbol (i.e., a symbol that does not appear in the language alphabet of the grammar) to one or more terminal symbols (i.e., symbols that do appear in the language alphabet of the grammar) and/or non-terminal symbols. These production rules describe all valid strings in the grammar's language. For example, the following is a simple context-free grammar comprising the non-terminal symbols A and B and the terminal symbols c and d.

A→B d
B→c/d

Listing 1

In this example, the first production rule indicates that non-terminal symbol A can be replaced with non-terminal symbol B concatenated with terminal symbol d. Further, the second production rule indicates that non-terminal symbol B can be replaced with terminal symbol c or terminal symbol d. As a result, the language of this context-free grammar encompasses the strings "c d" and "d d." The "context-free" qualifier indicates that terminal symbols can never appear on the left-hand side of a production rule, which generally means that the grammar's production rules are not dependent on, and therefore apply regardless of, the context in which the non-terminal symbols appear.

Tying this definition back to the syntax string of a CLI command definition, in various embodiments the syntax string can convey a set of one or more production rules that map the CLI command (which can be considered a non-terminal symbol) to various combinations/sequences of the syntax elements of the CLI command (which can be considered terminal symbols in the CLI command's language alphabet). Thus, the syntax string can effectively represent a context-free grammar that describes how the CLI command's syntax elements may be combined/sequenced in order to produce valid instances of the CLI command.

To illustrate this, the following table lists a number of example syntax strings, descriptions of the production rules expressed in the syntax strings, and the valid CLI command instances that may be produced/allowed by each syntax string according to certain embodiments.

| Syntax String | Description | Valid Command Instances |
| --- | --- | --- |
| show version [ detail ] | After the syntax elements "show" and "version," "detail" may appear or be omitted | (1) show version<br>(2) show version detail |
| alias ( ( commands_path PATH_VAL ) \| (CMD_ALIAS ORIGINAL_CMD ) ) | After the syntax element "alias," "commands_path PATH_VAL" or "CMD_ALIAS ORIGINAL_CMD" may appear | (1) alias commands_path PATH_VAL<br>(2) alias CMD_ALIAS ORIGINAL_CMD |
| rollback clean-config [ { CONFIG_GROUPS } ] | After the syntax elements "rollback" and "clean-config," | (1) rollback clean-config<br>(2) rollback clean-config <configGroup1> |

-continued

| Syntax String | Description | Valid Command Instances |
| --- | --- | --- |
| | "CONFIG_GROUPS" may appear multiple times or be omitted | (3) rollback clean-config <configGroup1> <configGroup2><br>(4) rollback clean-config <configGroup1> <configGroup2> <configGroup3><br>. . . |

In the foregoing examples, the left-hand side (i.e., non-terminal symbol) of the production rule(s) expressed by each syntax string is omitted because that non-terminal symbol is assumed to be the CLI command itself (in the other words, a syntax string "a|b" for a CLI command C1 implies the production rule "C1→a|b"). In alternative embodiments, this left-hand side portion may be explicitly included in the syntax string.

Further, the example syntax strings above employ a particular subset of EBNF (Extended Backus-Naur form) notation, which is a family of metasyntax notations for expressing context-free grammars. This EBNF notation subset supports the following operators between or among terminal/non-terminal symbols:

- Alternation operator "|"—Indicates that, in the notation "a|b", a or b may appear exactly once, but not both
- Optional operator "[ . . . ]"—Indicates that, in the notation "[a], [b], . . . ]", a, b, etc. may each be omitted or appear exactly once
- Repetition operator "{ . . . }"—Indicates that, in the notation "{a, b, . . . }", a, b, etc. may each appear one or more times
- Grouping operator "( . . . )"—Indicates that, in the notation "(a b)", a and b should be concatenated and grouped together for operator evaluation purposes In alternative embodiments, any other type of notation capable of expressing a context-free grammar (e.g., other variants of EBNF, BNF (Backus-Naur form), augmented BNF, etc.) may be employed.

Yet further, in the foregoing examples upper-case letters are used to denote syntax elements that are input parameters for the CLI command (i.e., syntax elements that will be replaced by some input value at the time of command submission), whereas command keywords or other literals are presented using lower case letters. This is a convention that allows users to quickly understand the high-level semantic structure of a CLI command by looking at its syntax string's capitalization structure.

2.2 Data Dictionary

The data dictionary of a CLI command definition is a data structure that codifies the semantics of the syntax elements included in the command's syntax string, thereby facilitating the matching of those syntax elements to input text tokens by runtime command parser 114.

In one set of embodiments, this data dictionary can be structured as a set of key-value entries where the key portion of the entry is the syntax element itself and where the value portion of the entry is either (1) a data object (referred to as a "element definition") that includes semantic information regarding the corresponding syntax element or (2) a reference to a sub-expression (described in section 2.5 below). In certain embodiments, the semantic information included in the element definition can comprise a matcher function and various other functions, rules, and/or parameters (collectively referred to as "matching controls") that can control or influence how the syntax element is matched to an input text token. These aspects of the element definition are discussed in turn below.

2.2.1 Matcher Function

The matcher function in an element definition is a function that processes a token from an input text string and returns an indication of whether the corresponding syntax element of the CLI command matches the token or not. Thus, this function effectively encodes the semantic nature of the syntax element for matching purposes. For example, if the syntax element is a command keyword such as "protocol," the matcher function may check whether the input text string token literally matches the word "protocol." As another example, if the syntax element is an integer input parameter such as "NUM_GROUPS," the matcher function may check whether the input text token is an integer within some predefined range associated with the NUM_GROUPS parameter. As described in section 4 below, runtime command parser 114 can invoke these matcher functions at the time of parsing an input text string in order to match the tokens in that input text string to syntax elements/nodes in a final parse graph 112.

In certain embodiments, CLI 100 may implement a number of predefined matcher functions that apply to common types of syntax elements and make these predefined matcher functions available to developers/users for use in their CLI command definitions. The following table presents an example list of such predefined matcher functions and their input arguments. In some cases, these predefined matcher functions may share certain common input arguments (e.g., a "helpdesc" or help description argument, a "helpname" argument, etc.) which are not explicitly identified.

TABLE 2

| Function Name | Description | Arguments |
| --- | --- | --- |
| KeywordMatcher | Matches a literal keyword (case-insensitive) | keyword - the literal string token to be matched<br>alternates - alternate versions of the keyword that may be accepted<br>autoCompleteMinChars - minimum number of characters that should be present in a partial command |

TABLE 2-continued

| Function Name | Description | Arguments |
|---|---|---|
| DynamicKeywordMatcher | Matches a set of keywords (case-insensitive) | before auto-completion can be performed<br>keywordFn - function that returns a dictionary of keywords to be matched (with associated help descriptions)<br>emptyTokenCompletion - return returned by matcher's completion function if invoked with an empty input string token |
| EnumMatcher | Matches a set of keywords (case-insensitive) like DynamicKeywordMatcher, but takes as input the keyword dictionary rather than calling a runtime function | keywordsHelpDescMapping - dictionary of keywords to be matched (with associated help descriptions) |
| PatternMatcher | Matches a regular expression | pattern - regular expression to be matched<br>partialPattern - used for command completion |
| DynamicNameMatcher | Matches a regular expression like PatternMatcher, but takes an additional argument (namesFn) for displaying help text | namesFn - function that returns a list or dictionary for generating help text tokens<br>pattern - regular expression to be matched<br>partialPattern - used for command completion |
| StringMatcher | Matches a string (including whitespaces) | |
| IntegerMatcher | Matches an integer within a predefined range | lbound - lower bound of accepted range<br>ubound - upper bound of accepted range |
| DynamicIntegerMatcher | Matches an integer within a dynamically computed range | rangeFn - function that returns a tuple of (<lowerBound>, <upperBound>) |
| FloatMatcher | Matches a floating point value within a predefined range | lbound - lower bound of accepted range<br>ubound - upper bound of accepted range<br>precisionString - format string of the form "%f" or "%0.1f," etc. |
| DynamicFloatMatcher | Matches a floating point value within a dynamically computed range | rangeFn - function that returns a tuple of (<lowerBound>, <upperBound>)<br>precisionString - format string of the form "%f" or "%0.1f," etc. |

To further clarify how matcher functions may be defined and used, the code listing below presents an example data dictionary (i.e., "data") that includes entries for command syntax elements "local," "port," and "PORT" and identifies corresponding matcher functions for each syntax element. In this example, it is assumed that the specification of a string in place of a matcher function definition will automatically generate an instance of a KeywordMatcher with that string as the help description argument value. Thus, in the case of the syntax elements "local" and "port," KeywordMatchers will be automatically generated for these elements with the help descriptions "Configure the local port for the tunnel" and "Set the port to use," respectively.

Listing 2

```
data = {
    'local': 'Configure the local port for the tunnel',
```

-continued

Listing 2

```
    'port': 'Set the port to use',
    'PORT': IntegerMatcher(serverPort.min, serverPort.max,
        helpdesc='Port
number'),
}
```

2.2.2 Matching Controls

In addition to the matcher function, in certain embodiments the element definition for a syntax element can include zero or more other functions/rules/parameters (i.e., matching controls) that can affect how the syntax element will be matched to an input text token by runtime command parser 114. In some cases, these matching controls can modify or override the production rule(s) of the context-free grammar expressed in the CLI command definition's syntax string, thereby effectively adding context to that grammar.

One such matching control is a guard function, which is a function that can dynamically disable a CLI command (or in other words, dynamically prevent the command from being matched to an input text string) based on some criterion determined at CLI runtime. For instance, consider a scenario where a CLI command C1 should not be executed if another CLI command C2 has already been executed/enabled. In this scenario, a guard function can be included in the data dictionary of C1 that prevents C1 from being matched under this specific runtime condition.

By way of example, the following is a code listing of an element definition (referred to as a "Node") for the syntax element "nexthop-group" that includes a reference to a guard function "nexthopGroupSupportedGuard."

Listing 3

```
nexthopGroupKw = Node (
    matcher = KeywordMatcher('nexthop-group',
    helpdesc='Specify nexthop
    group name'),
    guard =nexthopGroupSupportedGuard )
```

Another matching control that may be included in the element definition is a "max matches" parameter. If specified, this parameter can limit the number of times a syntax element is matched to a token in a given input text string. For example, consider the syntax string and data dictionary below:

Listing 4

```
syntax ="{a | b | c }"
data = {
    "a": Node (
        matcher = KeywordMatcher( "a", helpdesc=". . ."
    ),
    maxMatches = 1 ),
    "b": Node (
        matcher = KeywordMatcher( "b", helpDdesc=". . ."
    ),
    maxMatches = 1 ),
    "c": Node (
        matcher =KeywordMatcher( "c", helpdesc=". . ."
    ) ,
    maxMatches = 1 ) }
```

In this example, the syntax elements "a," "b," and "c" are each defined with a max matches parameter of 1. Accordingly, these elements may each be matched at most once (despite the use of the repetition operator in the syntax string), resulting in the following list of valid instances for the command: "a," "a b," "a b c," "a c," "a c b," "b," "b a," "b a c," "b c," "b c a" "c," "c a," "c a b," "c b," and "c b a."

Yet another matching control that may be included in the element definition is a "shared match object" parameter, which is related to the max matches parameter. If specified, the shared match object parameter can cause multiple syntax elements to share the same match count during the parsing of an input text string, which means that a match of any those elements will add to the running match count of each element (and thereby contribute to the element reaching its max matches limit, as specified via the max matches parameter). For example, the following code listing illustrates one possible use case for the shared match object parameter:

Listing 5

```
sharedObj = object( ) // Declare an object that is to be shared
class Cmd( . . . ):
    syntax = "{a | ( b | c ) | d }"
    data = { "a" : Node( matcher= . . . , maxMatches = 1 ),
        "b" : Node( matcher= . . . ,
            maxMatches = 1,
            sharedMatchObj = sharedObj ),
        "c" : Node( matcher= . . . ,
            maxMatches = 1,
            sharedMatchObj = sharedObj ),
        "d" : Node( matcher= . . . , maxMatches = 1 ) }
```

Yet another matching control that may be included in the element definition is a "store shared result" parameter. If specified, this parameter can store the match result and matched input text token for a syntax element in a shared data area during the parsing of an input text string. This stored result/token can be subsequently used by, e.g., the matcher function of a downstream syntax element in the same input text string in order to dynamically modify its matching logic based on the previous match. For example, consider the syntax string and data dictionary below:

Listing 6

```
syntax = 'snmp-server enable traps [ TRAP_TYPE [ { TRAP 1 } ] ]'
data = {
    'snmp-server': SnmpCli.snmpServerKwMatcher,
    'enable': 'Enable traps to all configured recipients',
    'traps': 'Enable traps to all configured recipients',
    'TRAP_TYPE': Node(
        DynamicKeywordMatcher( SnmpCli.getNotificationTypes ),
        storeSharedResult = True ),
    'TRAP': Node(DynamicKeywordMatcher(
        SnmpCli.getSpecificNotifications,
        passContext = True ),
        storeSharedResult = True )
```

In this example, the match result and matched token value of the "TRAP_TYPE" syntax element is stored during parsing and this stored result/token value is passed into the matcher function of the "TRAP" syntax element (in accordance with the argument "passContext=True"). As a result, the TRAP matcher function can accept different TRAP values based on the TRAP_TYPE that precedes it.

Yet another matching control that may be included in the element definition is a priority parameter. As explained in further detail in section 4 below, this priority parameter can help runtime command parser 114 disambiguate between two possible matches for a given input text token by selecting the syntax element/graph node with the higher priority. In certain embodiments, if no priority value is specified, this parameter can be set to a default value (e.g., normal priority).

2.3 Command Handler

The command handler of a CLI command definition is a function that specifies the logic to be executed by CLI 100 when the CLI command is matched to an input text string. The command handler can be defined within the CLI command definition itself or can be defined in a separate location/file that is referenced by (or in other words, bound to) the CLI command definition. This latter approach can be useful in reducing code duplication in scenarios where multiple CLI commands share the same command handler logic.

In one set of embodiments, the command handler can take as input two arguments: the current CLI command mode and a dictionary comprising all of the tokens (and matching syntax elements) included in the input text string matched to the handler's CLI command. This information can be passed to the command handler by runtime command parser 114.

Further, in some embodiments multiple command handlers may be defined/referenced within a single CLI command definition. This may occur if, for example, the CLI command supports multiple command variants that each necessitate different handler logic (e.g., a "no" variant for disabling/reversing the actions of the CLI command and a "default" variant for setting some device state associated with the CLI command to a default value).

2.4 Mode Association(s)

The mode association(s) in a CLI command definition associate the CLI command with one or more CLI command modes, which can be understood as different user interface states of CLI 100 that enable users to perform different types of configuration or management tasks. Examples of such CLI command modes in the context of a network device include, e.g., an "EXEC" mode for displaying system information, performing basic tests, connecting to remote devices, and changing terminal settings; a "privileged EXEC" mode for configuring operational and global parameters; an "interface configuration" mode for configuring or enabling Ethernet, VLAN, and port-channel features; and a "protocol-specific" mode for modifying certain network protocol settings.

Generally speaking, once a user has entered a given CLI command mode during the runtime of CLI 100, the user will be allowed to submit and execute CLI commands that are associated with that mode but will be prevented from submitting and executing CLI commands that are not associated with that mode (note that in some cases where a hierarchy of command modes are defined, a user may be allowed to execute CLI commands associated with a current mode or any parent mode of the current mode). Thus, the mode association(s) included in the CLI command definition indicate the CLI command mode(s) in which the CLI command may be validly used. To the extent that a CLI command may be relevant to multiple CLI command modes, the CLI command may be associated with each of those multiple modes in its command definition.

2.5 Sub-Expressions

As noted in section 2.2, in some cases a syntax element of a CLI command may be mapped to a sub-expression, rather than to an element definition, in the command definition's data dictionary. As used herein, a sub-expression is a portion of a command syntax that is defined in a similar manner as a regular CLI command. For example, a sub-expression definition can include a syntax string expressing a context-free grammar for producing valid instances of the sub-expression and a corresponding data dictionary for the syntax elements in the sub-expression's syntax string.

By allowing command syntax elements to be mapped to sub-expressions, CLI commands can be composited from separate reusable pieces, which facilitates the definition of commands that include multiple repeating sections and/or share syntax commonalities with others. For example, consider a first CLI command C1 with the syntax string "a|([x|y|z])" and a second CLI command C2 with the syntax string "b|([x|y|z])." In this case, a subexpression S may be defined as "[x|y|z]" and commands C1 and C2 can be rewritten as "a|EXPR" and "b|EXPR" respectively. Further, the data dictionaries for commands C1 and C2 may map syntax element "EXPR" to subexpression S. With this setup, the element "EXPR" in the syntax strings of C1 and C2 will be automatically expanded to include the content of sub-expression S at, e.g., the time of creating command parse graphs 110. This advantageously avoids the need to specify the entire contents of the sub-expression in each of the definitions for C1 and C2.

The following is an example code listing implementing the scenario above:

---
Listing 7
---
```
class S( CliExpression ):
    expression = '[ x | y | z ]'
    data = {
        'x': '...',
        'y': '...',
        'z': '...'
    }
class C1( CliCommandClass ):
    syntax = 'a | EXPR'
    data = {
        'a': '...',
        'EXPR': S
    }
class C2(CliCommandClass ):
    syntax = 'b | EXPR'
    data = {
        'b': '...',
        'EXPR': S
    }
```
---

In some embodiments, a sub-expression itself may include syntax elements that map to other sub-expressions, thereby enabling the recursive composition of very large and complex CLI commands.

3. Parse Graph Generator and Command/Final Parse Graphs

Figure 2:
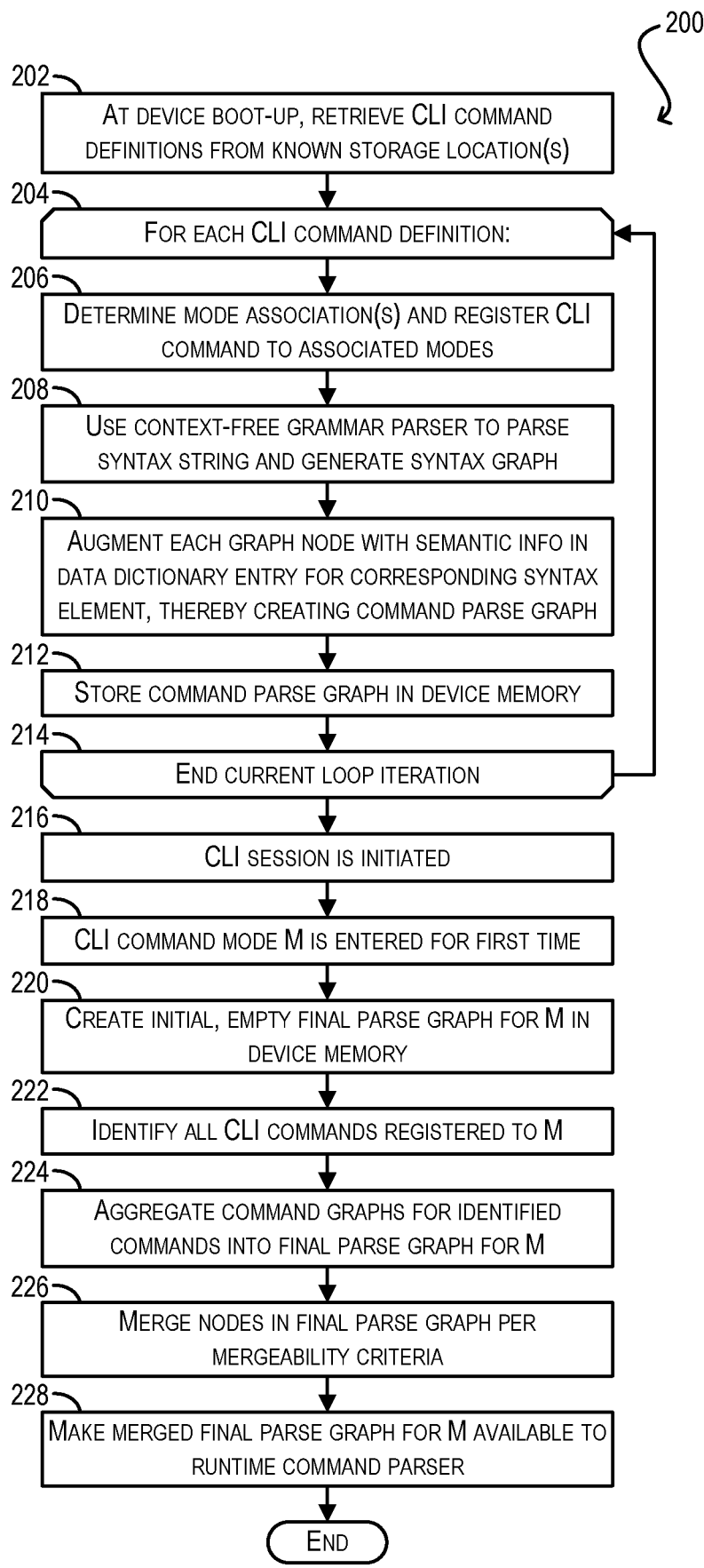
FIG. 2 depicts a flowchart for generating parse graphs from CLI command definitions according to certain embodiments.

With the foregoing CLI command definition language in mind, FIG. 2 depicts a flowchart 200 that may be performed by parse graph generator 106 and its context-free grammar parser 108 for generating command parse graphs 110 and final parse graph(s) 112 from CLI command definitions 104 according to certain embodiments. Runtime command parser 114 can subsequently use final parse graph(s) 112 (which can be considered graph-based internal representations of the CLI commands embodied in CLI command definitions 104, aggregated on a command mode basis) in order to process input text strings during the runtime of CLI 100.

Starting with block 202 of FIG. 2A, at boot-up of network device 102, parse graph generator 106 can retrieve CLI command definitions 104 from one or more known storage locations. These storage location(s) may be local to network device 102 or on a remote machine. In a typical scenario, CLI command definitions 104 will be created by the developers of network device 102 and thus be included in one or more predefined directories of the software image installed onto the device. However, in some cases CLI command definitions 104 may be defined by other entities (e.g., device customers/users), in which case those entities may configure CLI 100/parse graph generator 106 to retrieve definitions 104 from one or more custom-defined locations.

At block 204, parse graph generator 106 can enter a loop for each CLI command definition retrieved at block 202. Within this loop, parse graph generator 106 can determine the mode association(s) defined within the CLI command definition and register, in device memory, the CLI command embodied in that definition to the associated command mode(s) (block 206).

Figure 3:
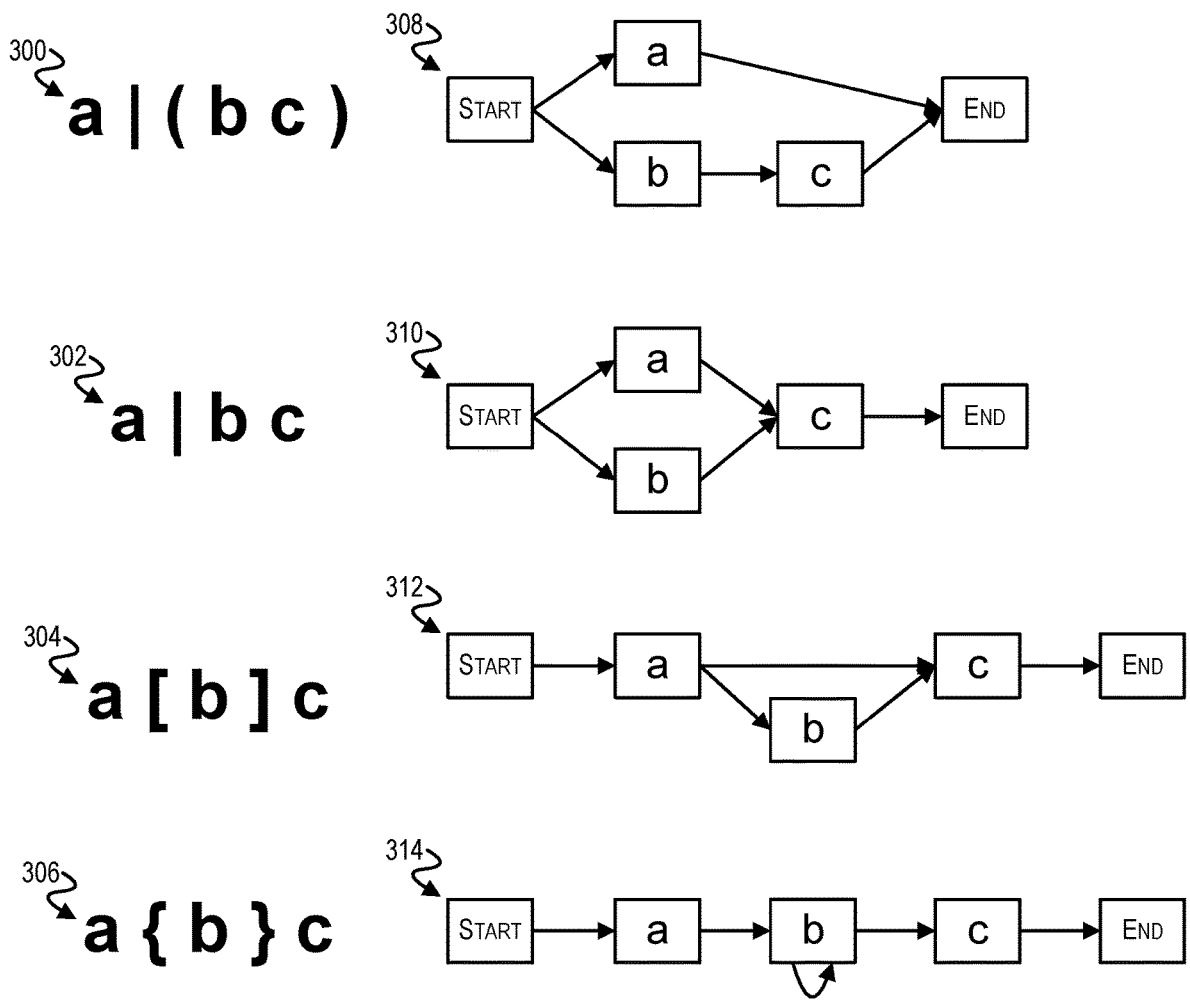
FIG. 3 depicts example syntax graphs according to certain embodiments.

Parse graph generator 106 can then generate a command parse graph 110 for the CLI command based on its command definition according to a two-step process. In particular, at block 208, parse graph generator 106 can first employ context-free grammar parser 108 to parse the syntax string in the CLI command definition and generate an intermediate version of the command parse graph (referred to as a "syntax graph") that encodes the context-free grammar of the CLI command, as expressed in the syntax string. For example, FIG. 3 depicts four example EBNF syntax strings 300, 302, 304, and 306 and syntax graphs 308, 310, 312, and 314 that may be generated for those syntax strings. As shown in this figure, the graph nodes in the syntax graphs correspond to syntax elements in their respective syntax strings and the edges between graphs nodes encode the possible syntax element combinations/sequences that are deemed allowable (or in other words, may be produced) by the context-free grammars expressed in the syntax strings. Each syntax graph also includes a start node indicating the start of production for that grammar/graph and an end node indicating the end of production for that grammar/graph.

In certain embodiments, as part of block 208, context-free grammar parser 108 can replace any sub-expressions included in the CLI command's syntax string with the syntax strings of those sub-expressions and can build the syntax graph based on the fully-expanded out version of the syntax string.

Once context-free grammar parser 108 has created the syntax graph for the CLI command, parse graph generator 108 can augment each syntax graph node with the semantic information (e.g., matcher function, matching controls, etc.) included in the data dictionary entry for that graph node/syntax element (block 210). In this way, parse graph generator 106 can incorporate this semantic information directly into the graph nodes. As part of this process, in some embodiments parse graph generator 106 can add certain additional pieces of information to each graph node, such as a "name" field (identifying the name of the syntax element represented by the graph node), a reference to the CLI command's command handler (if, e.g., the current graph node is a terminal node that immediately precedes the end node), and a "next nodes" list that identify all possible next nodes from the current graph node. The end result of block 210 is the command parse graph 110 for the CLI command, which parse graph generator 106 can save in device memory (block 212).

At block 214, the end of the current loop iteration can be reached and parse graph generator 106 can repeat blocks 204-214 until all retrieved CLI command definitions have been processed.

At blocks 216 and 218, a user or some other entity can initiate a session of CLI 100 and can enter a particular CLI command mode M for the first time. CLI command mode M may be a mode that CLI 100 enters by default upon, e.g., session startup or a mode that is entered via an explicit mode change command.

In response, parse graph generator 106 can create an initial, empty final parse graph 112 for mode M in device memory (block 220) and can identify all of the CLI commands that have been registered to mode M per previous block 206 (block 222). Parse graph generator 106 can then aggregate all of the command parse graphs for the CLI commands registered to mode M into the final parse graph for M (block 224). Stated another way, parse graph generator 104 can, for each command parse graph for a CLI command registered to M, incorporate the graph structure (e.g., graph nodes and edges) of that command parse graph into mode M's final parse graph. In this way, parse graph generator 106 can ensure that all of these registered CLI commands can be recognized and executed from the context of mode M.

Figure 4:
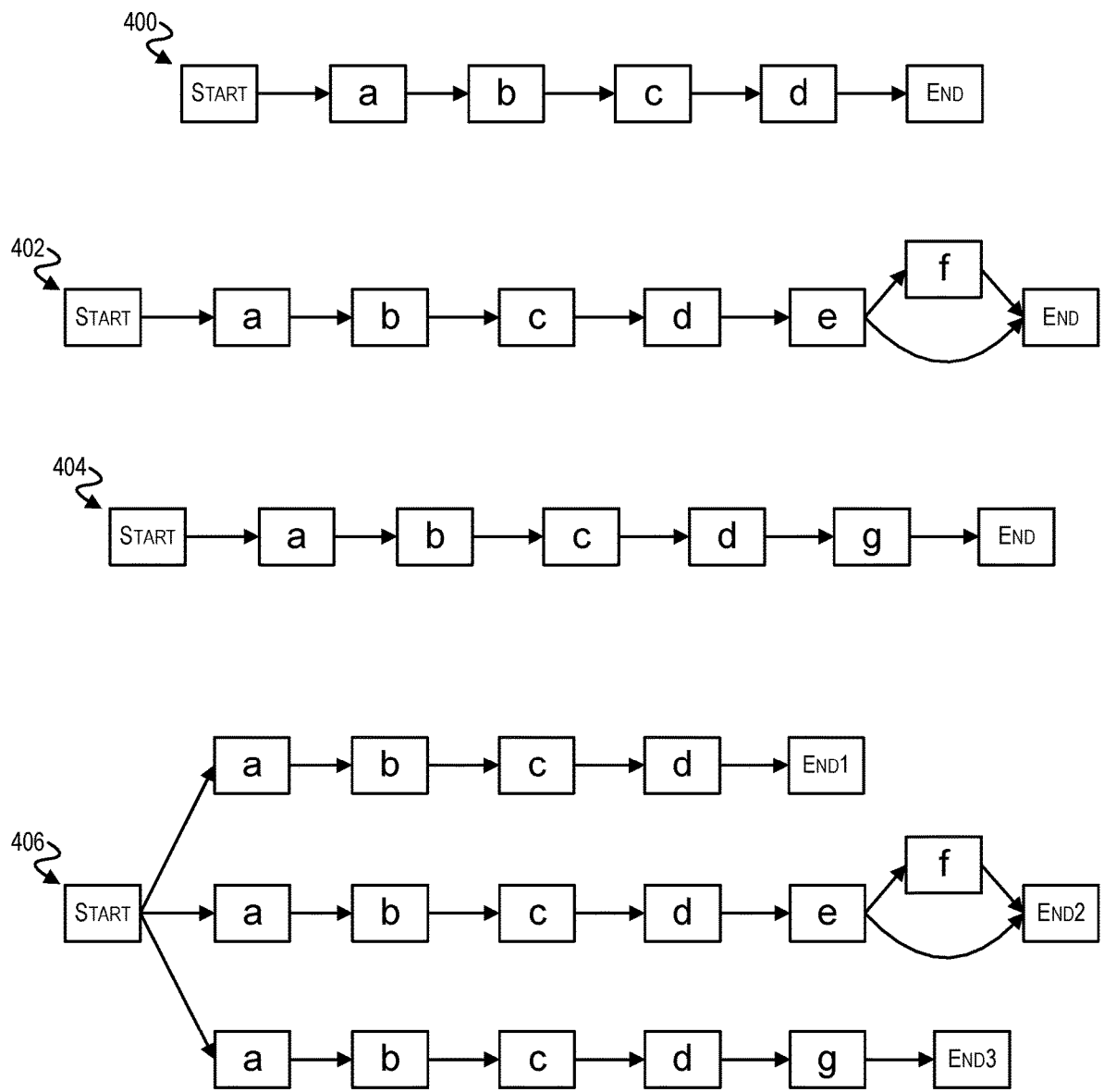
FIG. 4 depicts the creation of an unmerged final parse graph according to certain embodiments.

By way of example, FIG. 4 depicts three example command parse graphs 400, 402, and 404 and a final parse graph 406 that aggregates all three. In this figure, for simplicity of illustration, each graph node is identified by its corresponding syntax element name and does not display the semantic information included in that node.

Figure 5:
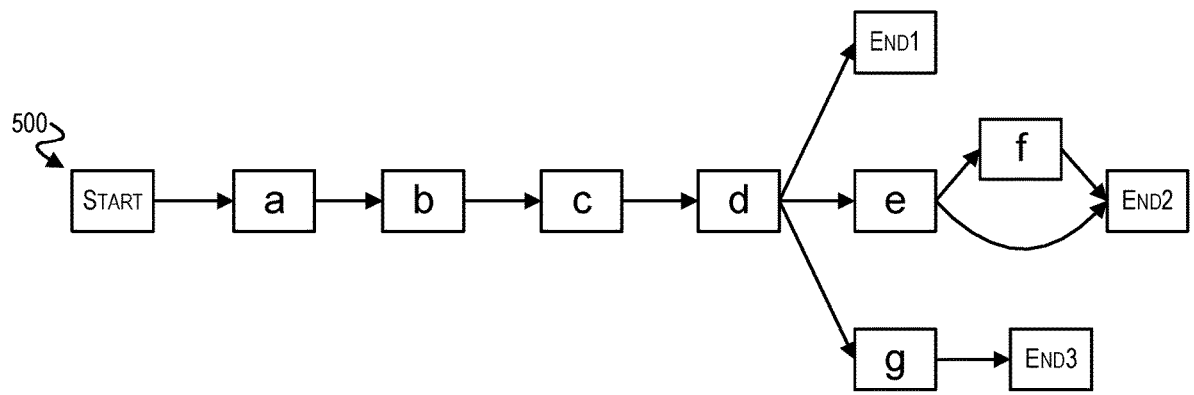
FIG. 5 depicts a merged version of the final parse graph of FIG. 4 according to certain embodiments.

Upon aggregating the various command parse graphs for M into a final parse graph, at block 226 parse graph generator 106 can walk through the final parse graph and merge together nodes in the graph that it deems to be the same (and meet certain other mergeability criteria). Through this merging process, parse graph generator 106 can reduce or eliminate duplicate traversal paths through the final parse graph, which advantageously reduces its memory footprint and can increase graph traversal speed. For example, FIG. 5 depicts a merged version 500 of final parse graph 406 of FIG. 4. As shown here, the graph nodes corresponding to syntax elements "a," "b," "c," and "d" are merged together, resulting in a single traversal path from the start node to the node for "d" (as compared to the three separate traversal paths depicted in unmerged graph 406).

In one set of embodiments, parse graph generator 106 will consider two graph nodes to be mergeable if the following conditions hold true:
1. The two nodes have the same name and include the same semantic information (e.g., matcher function, matching controls, etc.)
2. For each of the two nodes, there is only one possible path from the start node to that node Condition (2) above avoids introducing erroneous traversal paths in the merged graph that did not exist in the unmerged graph.

Finally, at block 228, parse graph generator 106 can make the merged final parse graph for mode M available to runtime command parser 114, which can use the merged final parse graph to parse text strings entered into CLI 100 in the context of mode M and match those input text strings to CLI commands encoded in the graph.

It should be appreciated that flowchart 200 is illustrative and various modifications are possible. For example, although flowchart 200 indicates that command parse graphs 110 are generated from CLI command definitions 104 at device boot-up and the final parse graph 112 for a CLI command mode M is generated upon entering mode M for the first time, in other embodiments the timings of these events may differ. For instance, in certain embodiments command parse graph generation can be delayed until a first final parse graph is generated (e.g., upon entering a mode). Alternatively, in certain embodiments the final parse graphs for some or all of the CLI command modes supported by network device 102 may be pre-generated at device boot-up.

As another example, although flowchart 200 indicates that parse graph generator 106 merges together nodes in the final parse graph for mode M once all of the command parse graphs for M have been added into that final parse graph, in other embodiments this merging may be performed in an incremental manner at the time each command parse graph is added.

As yet another example, in certain embodiments parse graph generator 106 may circumvent the merging of graph nodes in the final parse graph by identifying unique/mergeable nodes across the command parse graphs prior to adding them to the final parse graph. This approach can achieve the same effect of eliminating duplicate traversal paths while avoiding the need for an explicit merging step.

4. Runtime Command Parser

Figure 6A:
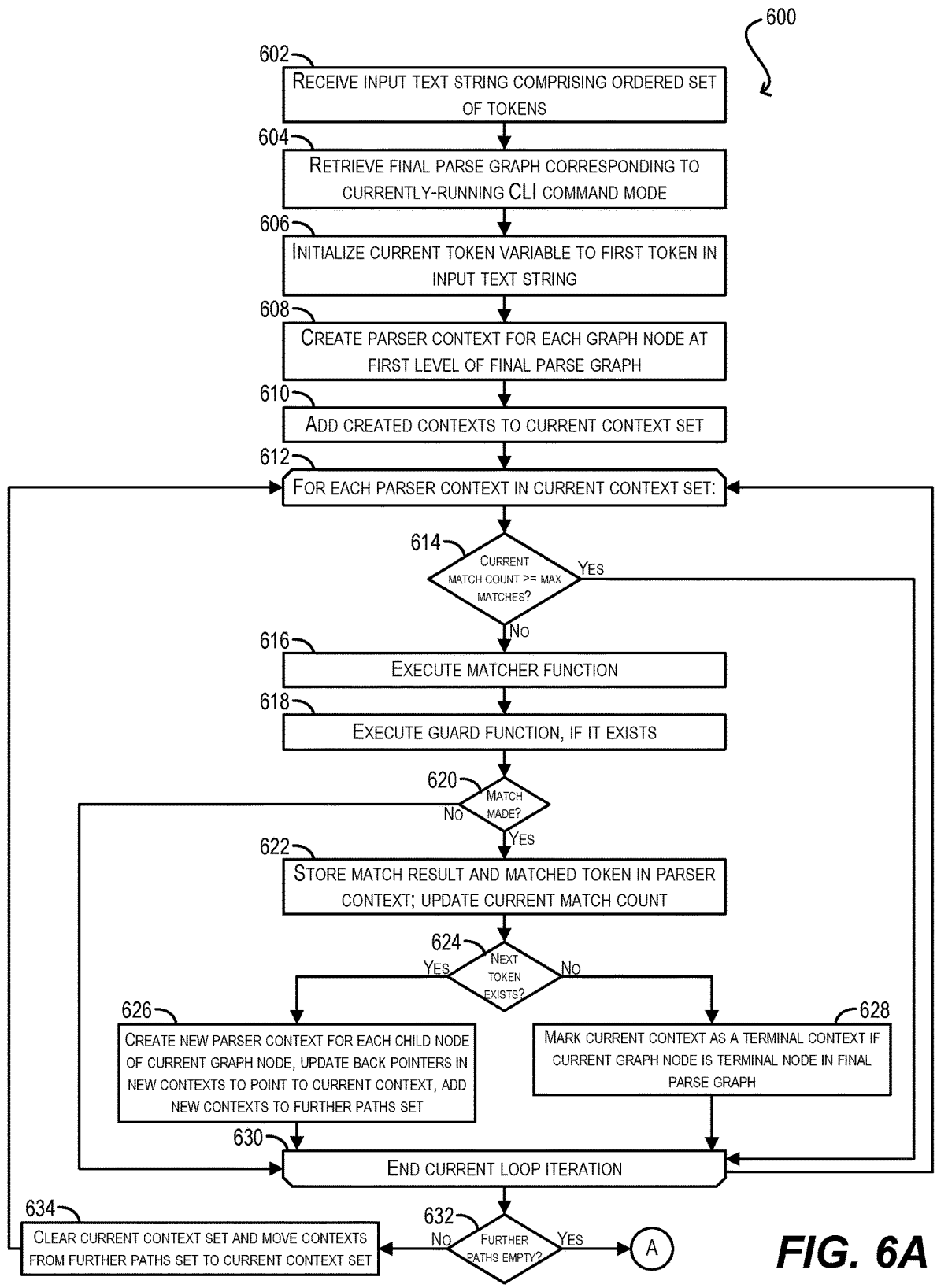
FIGS. 6A and 6B depict a flowchart for parsing an input text string according to certain embodiments.
Figure 6B:
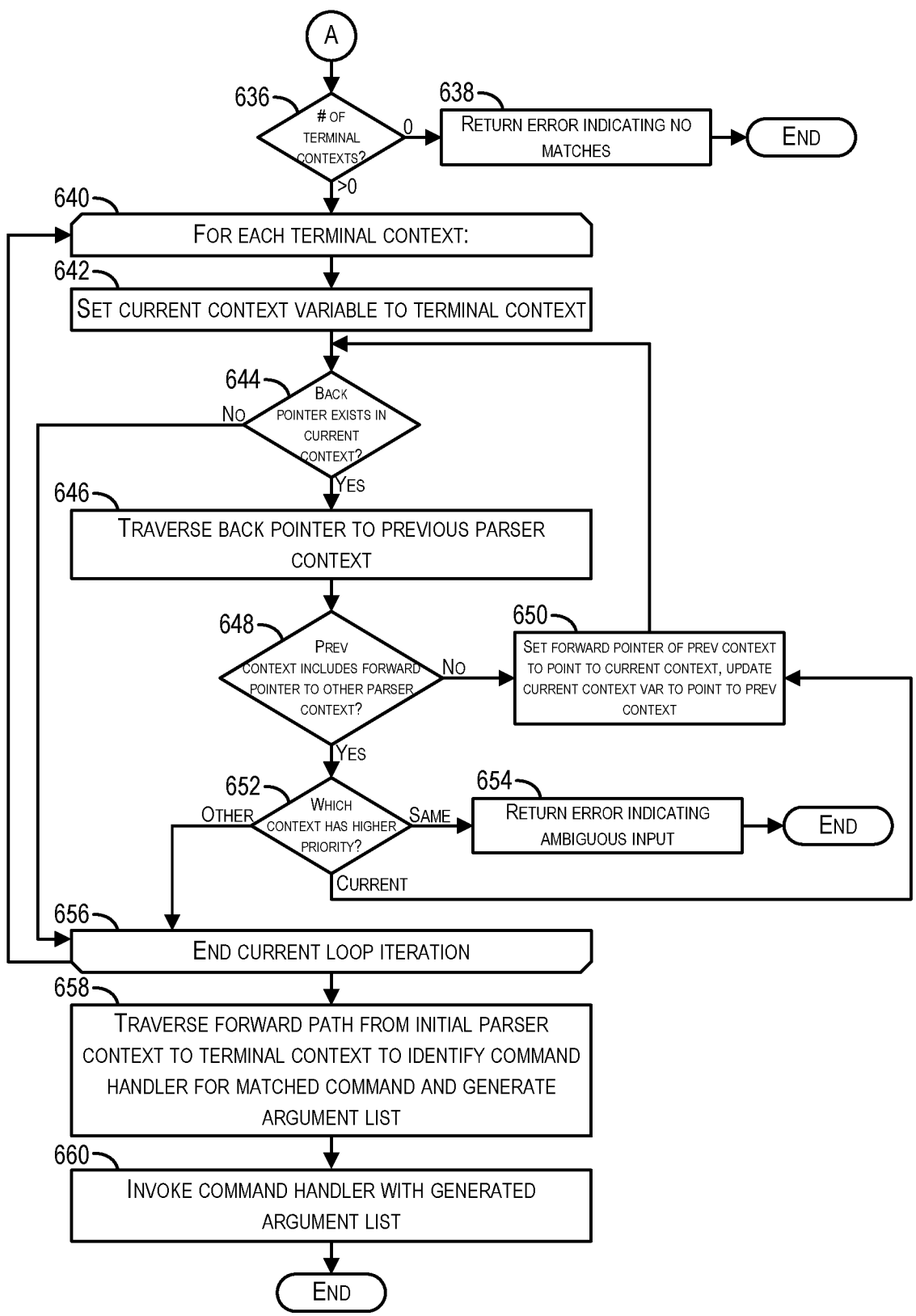

FIGS. 6A and 6B depict a flowchart 600 of an algorithm that may be executed by runtime command parser 114 for traversing a final parse graph 112 (as generated by parse graph generator 106 per flowchart 200) in order to parse an input text string and match that string to a valid CLI command according to certain embodiments. At a high level, this algorithm can proceed according to two stages: a first stage roughly corresponding to the steps shown in FIG. 6A and a second stage roughly corresponding to the steps shown in FIG. 6B. In the first stage, runtime command parser 114 can traverse down the final parse graph (in other words, starting from the start node) in a breadth-first manner and identify all traversal paths that match the input text string. As part of this downward traversal, runtime command parser 114 can run the matcher function included in each graph node and can take into account certain matching controls (e.g., guard function, max matches parameter, shared match object parameter, store shared result parameter) that may be defined in each graph node.

Once runtime command parser 114 has found all possible traversal paths (and thus all CLI commands that match the input text string), in the second stage runtime command parser 114 can traverse backwards through each found path in order to determine the single path that is most relevant (and thus corresponds to the command to be executed). This second stage can take into account any priority parameters that many be included in the graph nodes and use these priority parameters to resolve potential ties between different paths. Finally, once a single path has been selected, runtime command parser 114 can generate the argument list for that path/command and execute the command's command handler using the generated argument list.

Starting with block 602 of FIG. 6A, runtime command parser 114 can receive an input text string comprising an ordered set of tokens, where each token is a string of contiguous characters in the input text string between two spaces (or between a space and the start or end of the input text string). For instance, the example string "cmd 100 AAA.BBB.CCC.DDD" can be considered to comprise tokens "cmd," "100," and "AAA.BBB.CCC.DDD" in that order. In one set of embodiments, this input text string may be entered by a user of CLI 100 at the CLI's command prompt. In other embodiments, this input text string may be received from some other source such as a command script, a database table, an automated service/agent, etc.

At blocks 604 and 606, runtime command parser 114 can retrieve the final parse graph corresponding to the currently-running command mode for CLI 100 and can initialize a "current token" variable to the first token in the input text string. Runtime command parser 114 can then create a parser context for each graph node at the first level of the retrieved final parse graph (in other words, the level immediately following the start node) (block 608), add the created parser contexts to a current context set (block 610), and enter a loop for each parser context in the current context set (block 612).

In various embodiments, each parser context can be understood as a data structure that maintains context information pertaining to its corresponding graph node that is used or generated by runtime command parser 114 during the parsing process. This context information can include, e.g., matching control and other information defined for the graph node/syntax element within CLI command definitions 104 (e.g., max matches parameter, shared match object parameter, store shared result parameter, priority parameter, command handler binding, etc.) and match result information determined/generated by runtime command parser 114 (e.g., running match count, match result generated by the graph node's matcher function, matched input text token, etc.). As explained in further detail below, each parser context can also include a back pointer to a previous parser context and/or a forward pointer to a next parser context created by runtime command parser 114 while traversing the final parse graph. When a parser context is first created, its matching control information can be automatically populated from the semantic information encoded in the graph node and its match result and pointer information can be initialized to some default/initial values (e.g., back/forward pointers, match result, and matched input text token can be initialized to NULL and current match count can be initialized to zero).

Within the loop of block 612, runtime command parser 114 can first check whether the current match count in the parser context is equal to or greater than the value of the max matches parameter (block 614). If so, runtime command parser 114 can proceed directly to the end of the loop iteration (block 630). Otherwise, runtime command parser 114 can pass the parser context and current token to the matcher function of the parser context's corresponding graph node and execute the matcher function (block 616). In addition, runtime command parser 114 can execute the graph node's guard function, if it exists (block 618).

At block 620, runtime command parser 114 can check whether the output of the matcher function indicates that a match has been made (in other words, whether the current token matches the syntax element corresponding to the graph node). If the answer is no, runtime command parser 114 can skip to the end of the current loop iteration (block 630). Otherwise, runtime command parser 114 can store the match result and matched token in the parser context and update the parser context's current match count (block 622). As part of this step, if the guard function returned an error (indicating that the current graph node should not be matched), runtime command parser 114 can replace the matched token in the parser context with an indication of the guard error.

At block 624, runtime command parser 114 can further check whether there is a next token in the input text string. If there is a next token, runtime command parser 114 can create a new parser context for each child graph node of the current graph node, update the back pointer in each of the newly-created parser contexts to point to the current parser context, and add the newly-created parser contexts to a "further paths" set (block 626). If the current graph node points to itself (e.g., is defined within an iteration operator), runtime command parser 114 can also propagate the current match count in the current parser context to the newly-created parser context for the next iteration of the node.

On the other hand, if there is no next token at block 624 (in other words, the end of the input text string has been reached), runtime command parser 114 can mark the current parser context as a terminal context if the current graph node is a terminal node in the final parse graph (block 628).

Upon reaching the end of the current loop iteration (block 630), runtime command parser 114 can return to the top of the loop to process further parser contexts in the current context set. Once all such parser contexts have been processed, runtime command parser 114 can check whether the further paths set includes any parser contexts (block 632). If so, runtime command parser 114 can clear the current context set, move each parser context in the further paths set to the current context set, and return to the top of the loop (block 634).

Otherwise, the workflow can proceed to block 636 of FIG. 6B where runtime command parser 114 can check the number of terminal contexts that have been marked/identified. If the answer is zero, runtime command parser 114 can return an error indicating that no matches for the input text string have been found (block 638) and the workflow can end.

Alternatively, if the answer is greater than zero at block 636, runtime command parser 114 can enter a second loop for each terminal context that has been identified (block 640). Within this second loop, runtime command parser 114 can set a "current context" variable to point to the terminal context (block 642) and check whether a back pointer to a previous parser context exists in the current context (block 644). If not, runtime command parser 114 can proceed to the end of the current loop iteration (block 656).

On the other hand, if the answer at block 644 is yes, runtime command parser 114 can traverse the back pointer to that previous parser context (block 646) and subsequently check whether the previous parser context includes a forward pointer to some other parser context (block 648). If not, runtime command parser 114 can set the forward pointer of the previous parser context to point to the current context, update the current context variable to point to the previous parser context (block 650), and loop back to block 644.

If the previous parser context does include a forward pointer to another parser context at block 648, runtime command parser 114 can compare the priority parameters of the current context and that other parser context (block 652). If the priority of the other parser context is higher, runtime command parser 114 can proceed to the end of the current loop iteration (block 656). Alternatively, if the priorities of the two contexts are the same, runtime command parser 114 can return an error indicating that the input text string is ambiguous (block 654) and terminate the workflow. Alternatively, if the priority of the current context is higher, runtime command parser 114 can set the forward pointer of the previous parser context to point to the current context and update the current context variable to point to the previous parser context per block 650 and loop back to block 644.

Upon reaching the end of the current loop iteration (block 656), runtime command parser 114 can return to the top of the loop to process any further terminal contexts. Once all terminal contexts have been processed, there will be one forward path (linked via forward pointers) from an initial parser context to a terminal context which represents the matched CLI command for the input text string. At block 658, runtime command parser 114 can traverse this forward path to identify the command handler for the matched command and generate the argument list (e.g., matched tokens) for the command handler. Finally, runtime command parser 114 can invoke the command handler with the generated argument list (block 660) and the workflow can end. Note that if any of the argument list values indicate a guard error, runtime command parser 114 can present the guard error rather than invoking the command handler, thereby preventing the matched CLI command from being executed.

5. Example Network Device

Figure 7:
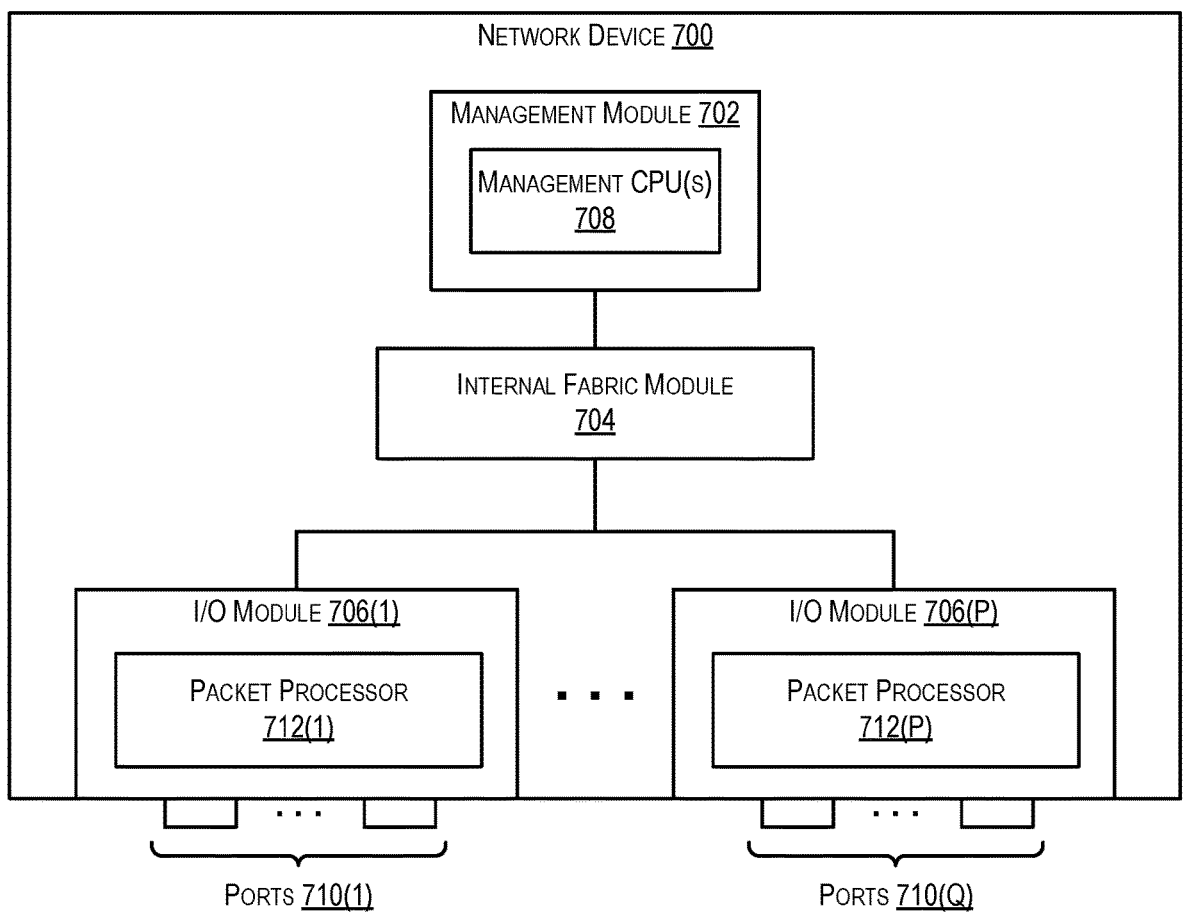
FIG. 7 depicts an example network device according to certain embodiments.

FIG. 7 depicts the architecture of an example network device (e.g., a network switch or router) 700 that may implement the techniques of the present disclosure according to certain embodiments. For example, network device 700 may correspond to network device 102 shown in FIG. 1.

Network device 700 includes a management module 702, an internal fabric module 704, and a number of I/O modules 706(1)-(P). Management module 702 includes one or more management CPUs 708 for managing/controlling the operation of the device. Each management CPU 708 can be a general-purpose processor, such as an Intel/AMD x86 or ARM-based processor, that operates under the control of program code maintained in an associated volatile memory and/or stored in a non-transitory computer readable storage medium (not shown). In one set of embodiments, this program code can include code for implementing some or all of the techniques described in the foregoing sections.

Internal fabric module 704 and I/O modules 706(1)-(P) collectively represent the data, or forwarding, plane of network device 700. Internal fabric module 704 is configured to interconnect the various other modules of network device 700. Each I/O module 706 includes one or more input/output ports 710(1)-(Q) that are used by network device 700 to send and receive network packets. Each I/O module 706 can also include a packet processor 712, which is a hardware processing component that can make wire speed decisions on how to handle incoming or outgoing network packets.

It should be appreciated that network device 700 is illustrative and other configurations having more or fewer components than network device 700 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular flowcharts and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in hardware can also be implemented in software and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A method comprising:
   retrieving, by a network device, a definition of a command line interface (CLI) command, wherein the definition of the CLI command includes:
   a syntax specification comprising one or more syntax elements, wherein the syntax specification expresses a grammar for producing valid instances of the CLI command; and
   a data structure comprising, for each syntax element in the one or more syntax elements, information indicating how the each syntax element is matched to input text strings;
   generating, by the network device, a parse graph based on the definition of the CLI command, wherein the parse graph incorporates the grammar and the information for the each syntax element, and wherein generating the parse graph comprises:
- generating a command parse graph associated with the CLI command;
- aggregating the command parse graph with other command parse graphs associated with other CLI commands of a plurality of CLI commands; and
- merging two or more nodes in the command parse graph that originate from different command parse graphs;

receiving, by the network device, an input text string;

identifying, by the network device, a match between the input text string and the CLI command by traversing the parse graph; and upon identifying the match between the input text string and the CLI command, invoking, by the network device, a command handler function associated with the CLI command.

2. The method of claim 1 wherein the parse graph is associated with a CLI command mode supported by the network device, and wherein the CLI command mode is associated with a plurality of CLI commands including the CLI command.

3. The method of claim 2 wherein the aggregating is performed at a time the CLI command mode is first entered.

4. The method of claim 1 wherein generating the command parse graph associated with the CLI command comprises:
- parsing the syntax specification using a grammar parser; and
- generating a syntax graph based on the parsing, wherein each node in the syntax graph represents a syntax element in the one or more syntax elements.

5. The method of claim 4 wherein generating the command parse graph associated with the CLI command further comprises:
- adding, to each node in the syntax graph, the information for the each syntax element represented by the each node in the syntax graph.

6. The method of claim 1 wherein the command parse graph associated with the CLI command is generated at boot-up of the network device.

7. The method of claim 1 wherein first and second nodes in the command parse graph are merged when:
- the first and second nodes in the command parse graph include identical information; and
- for each node of the first and second nodes in the command parse graph, there is a single traversal path from a start node in the command parse graph to the each node of the first and second nodes in the command parse graph.

8. A device comprising:
a processor; and
a non-transitory computer readable storage medium having stored thereon program code that, when executed by the processor, causes the processor to:
- retrieve a definition of a command line interface (CLI) command, wherein the definition of the CLI command includes:
  - a syntax specification comprising one or more syntax elements, wherein the syntax specification expresses a grammar for producing valid instances of the CLI command; and
  - a data structure comprising, for each syntax element in the one or more syntax elements, information indicating how the each syntax element is matched to input text strings;
- generate a parse graph based on the definition of the CLI command, wherein the parse graph incorporates the grammar and the information for the each syntax element, and wherein generating the parse graph comprises:
  - generating a command parse graph associated with the CLI command;
  - aggregating the command parse graph with other command parse graphs associated with other CLI commands of a plurality of CLI commands; and
  - merging two or more nodes in the command parse graph that originate from different command parse graphs;
- receive an input text string;
- identify a match between the input text string and the CLI command by traversing the parse graph; and
- upon identifying the match between the input text string and the CLI command, invoke a command handler function associated with the CLI command.

9. The device of claim 8 wherein the information for the each syntax element includes a matcher function that processes a token of an input text string and outputs an indication of whether the token of the input text string matches the each syntax element.

10. The device of claim 8 wherein the information for the each syntax element includes a guard function that outputs an indication of whether the each syntax element is matched to an input text string in view of one or more criteria determined at runtime of a CLI of the device.

11. The device of claim 8 wherein the information for the each syntax element includes a first parameter that indicates a maximum number of times the each syntax element is matched to tokens in an input text string.

12. The device of claim 11 wherein the information for the each syntax element further includes a second parameter that indicates a match count associated with the each syntax element is shared with one or more other syntax elements in the one or more syntax elements.

13. The device of claim 8 wherein the information for the each syntax element includes a parameter indicating that information regarding a match made between a token of the input text string and the each syntax element is saved in a shared memory area of a CLI parser of the device for use in facilitating matching of one or more other tokens in the input text string to one or more other syntax elements in the one or more syntax elements.

14. The device of claim 8 wherein the data structure further includes, for another syntax element in the one or more syntax elements, an identifier of a sub-expression, and wherein the sub-expression defines another syntax element to be inserted into a syntax string at a location of the another syntax element.

15. A non-transitory computer readable storage medium having stored thereon program code executable by a device, the program code comprising:
- code that causes the device to retrieve a definition of a command line interface (CLI) command, wherein the definition of the CLI command includes:
  - a syntax specification comprising one or more syntax elements, wherein the syntax specification expresses a grammar for producing valid instances of the CLI command; and a data structure comprising, for each syntax element in the one or more syntax elements, information indicating how the syntax element is matched to input text strings;

code that causes the device to generate a parse graph based on the definition of the CLI command, wherein the parse graph incorporates the grammar and the information for the each syntax element, and wherein generating the parse graph comprises;

generating a command parse graph associated with the CLI command;

aggregating the command parse graph with other command parse graphs associated with other CLI commands of a plurality of CLI commands; and merging two or more nodes in the command parse graph that originate from different command parse graphs;

code that causes the device to receive an input text string;

code that causes the device to identify a match between the input text string and the CLI command by traversing the parse graph; and code that causes the device to, upon identifying the match between the input text string and the CLI command, invoke a command handler function associated with the CLI command.

16. The non-transitory computer readable storage medium of claim 15 wherein the code that causes the device to identify the match between the input text string and the CLI command by traversing the parse graph comprises:

code that causes the device to execute a first stage graph traversal comprising traversing down the parse graph in a breadth-first manner and identifying all paths in the parse graph that correspond to CLI commands matching the input text string; and code that causes the device to execute a second stage traversal comprising traversing up each identified path in the parse graph and selecting a single path from among all the identified paths in the parse graph corresponding to the CLI command.

17. The non-transitory computer readable storage medium of claim 16 wherein the program code further comprises:

code that causes the device to, subsequently to selecting the single path from among all the identified paths in the parse graph corresponding to the CLI command, generate an argument list for the command handler function associated with the CLI command.

\* \* \* \* \*